United States Patent
Vanderlans et al.

(10) Patent No.: US 6,427,725 B1
(45) Date of Patent: Aug. 6, 2002

(54) PIPELINE LATERAL PACKER AND FELT COMBINATIONS AND METHODS THEREFOR

(76) Inventors: Gerald J. Vanderlans; Eric G. Vanderlans; Victor F. Schuh; Stephen L. Thomas, all of P.O. Box 758, Lodi, CA (US) 95240-8260

( * ) Notice: Subject to any disclaimer, the term of this patent is extended or adjusted under 35 U.S.C. 154(b) by 0 days.

(21) Appl. No.: 09/638,713

(22) Filed: Aug. 14, 2000

(51) Int. Cl.$^7$ .............................................. F16L 55/162
(52) U.S. Cl. .......................................... 138/98; 138/93
(58) Field of Search ................................ 138/97, 98, 93

(56) References Cited

U.S. PATENT DOCUMENTS

| | | |
|---|---|---|
| 539,568 A | 5/1895 | Bride |
| 1,048,208 A | 12/1912 | Raflovich |
| 1,240,433 A | 9/1917 | Foote |
| 1,549,962 A | 8/1925 | Burdette |
| 1,702,031 A * | 2/1929 | Wesseler ..................... 138/98 |
| 1,760,750 A | 5/1930 | Goodman |
| 1,842,652 A | 1/1932 | Biggs |
| 2,299,116 A | 10/1942 | Svirsky |
| 2,476,817 A | 7/1949 | Charnes |
| 2,559,064 A | 7/1951 | Cunningham |
| 2,612,924 A | 10/1952 | Cunningham |
| 2,613,169 A | 10/1952 | Cunningham |
| 2,623,571 A | 12/1952 | Webber |
| 2,672,902 A | 3/1954 | Prager |
| 2,927,609 A | 3/1960 | Vanderlans |
| 3,103,235 A | 9/1963 | Stringham, III |
| 3,168,909 A | 2/1965 | Zurbrigen et al. |
| 3,269,421 A | 8/1966 | Telford et al. |
| 3,618,639 A | 11/1971 | Daley et al. |
| 3,750,711 A | 8/1973 | Conklin et al. |
| 3,763,896 A | 10/1973 | Horne et al. |
| 3,834,422 A | 9/1974 | Larson |
| 3,874,926 A | 4/1975 | Horne et al. |
| 3,897,086 A | 7/1975 | Beinhaur |
| 3,951,173 A | 4/1976 | Larson |
| 4,025,360 A | 5/1977 | Horne et al. |
| 4,070,904 A | 1/1978 | Vanderlans |
| 4,079,755 A | 3/1978 | Vanderlans |
| 4,096,997 A | 6/1978 | Larson |
| 4,182,642 A | 1/1980 | Vanderlans |
| 4,274,206 A | 6/1981 | Moolenaar |
| 4,377,184 A | 3/1983 | Vetter |
| 4,421,698 A | 12/1983 | Vanderlans |
| 4,446,983 A | 5/1984 | Gerber |
| 4,467,835 A | 8/1984 | Champleboux |
| 4,467,836 A | 8/1984 | Ragout |
| 4,493,344 A | 1/1985 | Mathison et al. |
| 4,612,961 A | 9/1986 | Vetter |
| 4,614,206 A | 9/1986 | Mathison et al. |
| 4,627,470 A | 12/1986 | Carruthers |
| 4,691,728 A | 9/1987 | Mathison et al. |
| 4,719,687 A * | 1/1988 | Wanny ........................ 138/93 |
| 4,721,397 A | 1/1988 | Knutar |
| 4,763,511 A | 8/1988 | Mathison et al. |
| D300,350 S | 3/1989 | Mathison |
| 4,817,671 A | 4/1989 | Mathison et al. |
| 4,883,094 A | 11/1989 | Vetter |
| 4,893,389 A * | 1/1990 | Allen et al. .................... 138/98 |
| 5,040,283 A * | 8/1991 | Pelgrom ....................... 138/99 |
| 5,108,228 A * | 4/1992 | Miyazaki et al. ........... 405/154 |
| 5,285,817 A * | 2/1994 | Sigel ............................ 138/98 |
| 5,765,597 A * | 6/1998 | Kiest, Jr. et al. ............. 138/98 |
| 5,915,419 A * | 6/1999 | Tweedie et al. .............. 138/98 |
| 5,950,682 A * | 9/1999 | Kiest, Jr. ...................... 138/98 |
| 6,019,136 A | 2/2000 | Walsh et al. |
| 6,068,725 A * | 5/2000 | Tweedie et al. .............. 138/97 |

* cited by examiner

*Primary Examiner*—James Hook
(74) *Attorney, Agent, or Firm*—Bernhard Kreten

(57) ABSTRACT

A lateral packer and felt combination are disclosed for use in efficiently inhibiting infiltration into or out of a pipeline. The lateral packer is inflated and expands radially to secure the felt at the source of infiltration. Once the felt is secured, the lateral packer is removed and the felt left in place as a barrier to infiltration.

1 Claim, 4 Drawing Sheets

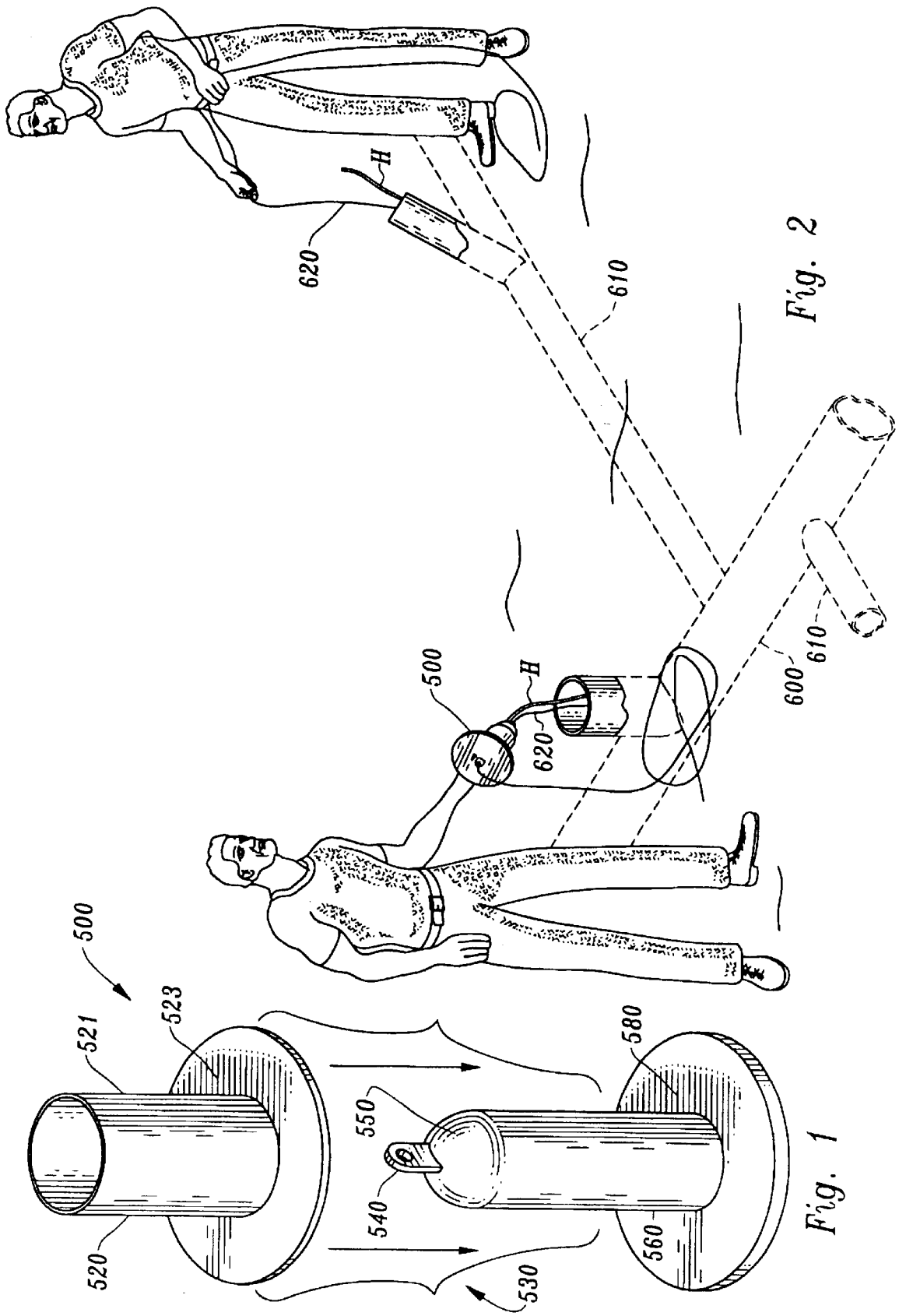

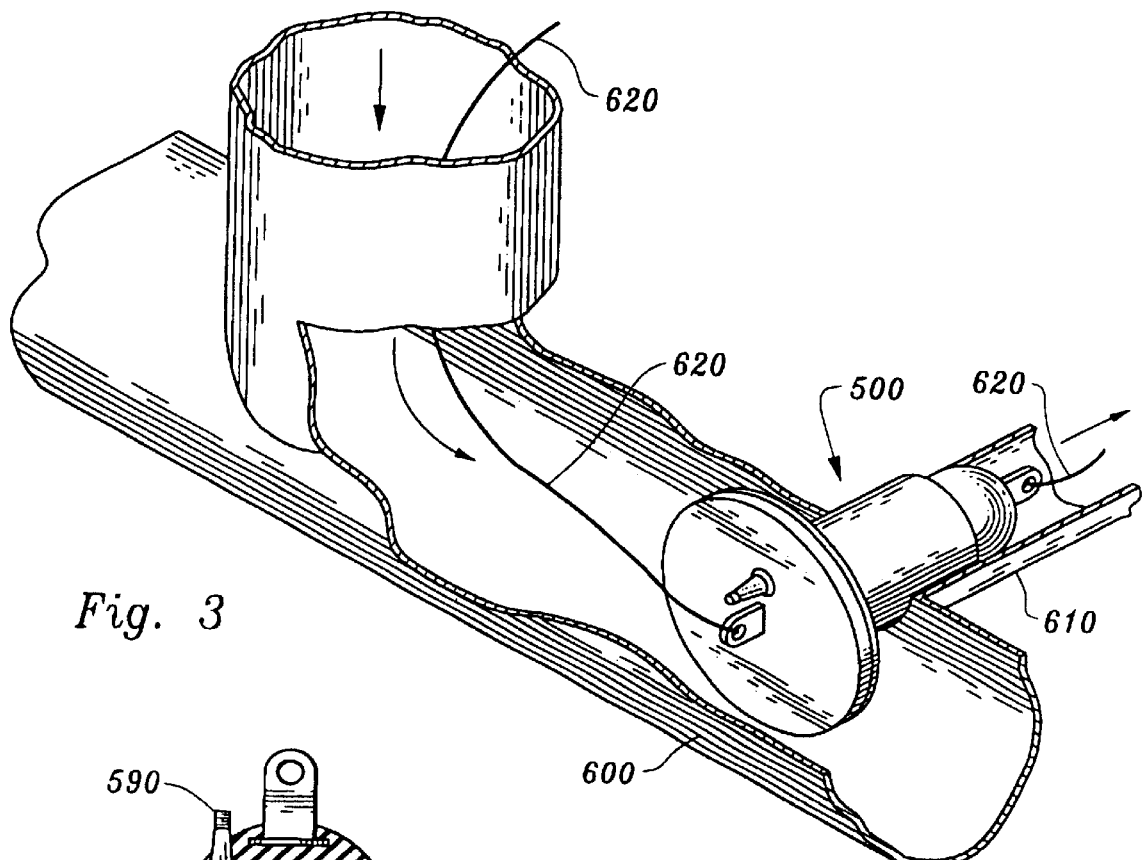
Fig. 3
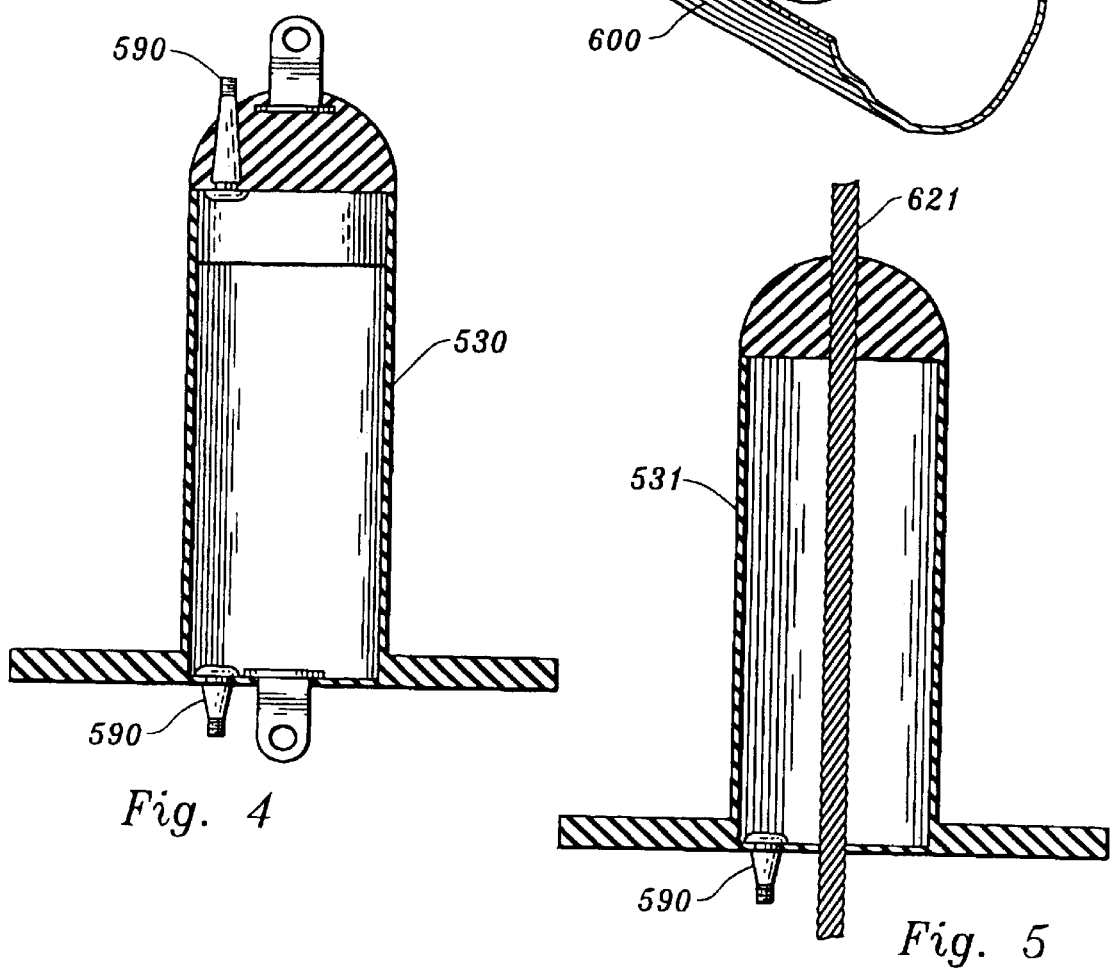
Fig. 4
Fig. 5

PIPELINE LATERAL PACKER AND FELT COMBINATIONS AND METHODS THEREFOR

FIELD OF THE INVENTION

The following invention relates generally to pipeline lateral packers which are used extensively in pipes, tubes, conduits, etc. in the application of a "felt" impregnated with epoxy in order to seal a crack in or collapse of said pipes, tubes, conduits, etc. Specifically, the invention relates to the application of a lateral packer having a "top-hat" felt in communication therewith. The invention permits the placement of the "top-hat" felt in the joint that connects a feed line to a main line in order to inhibit infiltration of fluids and other material into the pipeline because of a crack at the joint caused by a shift in position of the main line or feed line or both.

BACKGROUND OF THE INVENTION

Frequently, after a term of time, a pipeline, because of extrinsic phenomena, shifts from its original position. This shift in position causes undue stresses and strains on the pipeline. These stresses and strains particularly effect the integrity of the joints that connect any feeder lines to the main line. The result of this degradation in integrity yields cracks at the joint. These cracks permit fluid and other materials to enter into the pipeline and causes a contamination of the product being transported through the pipeline. The consequences of the contamination can range from destroying the usefulness of the product to excess cost in refining or cleaning the product because of an excess in material that has to be cleaned.

This excess cost in cleaning the product is readily illustrated with the treatment of sewage. There is a tendency within this segment of the art to have leakage at the joint between the main sewer line and each feeder line running from the real property that generates the sewage. The main concern of those skilled in this art is not raw sewage leaking out into the water table, although that is of an environmental concern to be dealt with accordingly; but one of clean water from the water table leaking into the sewer lines. This is known in the art as "infiltration". The infiltration of ground water is of concern because of the cost associated with treating the sewage. The cost of treating the sewage from the main sewer line is approximately one to two dollars per U.S. gallon. If clean water is introduced into the system, then this also is treated along with the sewage which increases the number of gallons that must be treated by the sewage treatment plant. The more gallons that have to be treated increases the total amount of money needed to treat a municipality's waste. With municipalities' budgets always under scrutiny to reduce costs, any reduction in the total amount of material presented for treatment at the sewage treatment plant would provide a reduction in the overall costs of municipality's operating budget.

The prior art's solution to the infiltration of ground water has been to apply an internal sleeve in the area of the crack and through trolley mechanisms and adhere this internal sleeve to the internal surface of the pipeline. The drawbacks to this system are many. For one thing, the prior art requires the use of a pipeline trolley that is fed into the main sewer line at a man-hole junction. Prior to insertion into the pipeline, the trolley is fitted with an internal sleeve for placement adjacent the crack or breach. The trolley is then inserted in the pipeline and worked up to the area in the pipeline where the crack or breach is located. Then the trolley has to be manipulated into a position that facilitates placement of the sleeving onto the internal pipeline surface juxtaposed the crack or breach. Then the application and setting of the sleeving is done with the trolley. Upon the fixing of the sleeving on the internal pipe surface, the trolley is repositioned and then extracted from the pipeline. As seen from this description the operation of this procedure is complex and time consuming. The prior art estimates it takes approximately two man hours to complete this operation. This operation has to be done for each breach and if there are multiple breaches, the amount of time required could be totally unacceptable to users of the pipeline because of the inconvenience of not being able to use fixtures that utilize the pipeline.

The present invention alleves the drawbacks of the prior art. As will be described infra, the present invention permits quick and easy access to the breach and permits multiple breaches to be fixed concurrently thus reducing the total downtime of the pipeline.

Further, in the installation, testing and maintenance of pipelines, it becomes necessary to interrupt the flow of the material contained within the pipeline or to seal off areas of the pipeline and divert the flow. Plugs which are inflatable are widely used and have proven extremely reliable in service. It is extremely likely that workmen will have to be protected only by the effectiveness of the plug when working downstream from the fluid flow. Thus, it is essential that these plugs operate in their intended manner. Currently a wide variety of different types of plugs are on the market which generally perform satisfactorily.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
| --- | --- | --- |
| 539,568 | May 32, 1895 | Bride, C. T. |
| 1,048,208 | December 24, 1912 | Raflovich, G. H. |
| 1,240,433 | September 18, 1917 | Foote, P. J. |
| 1,549,962 | August 18m 1925 | Burdette, R. S. |
| 1,760,750 | May 27, 1930 | Goodman, P. |
| 1,842,652 | January 26, 1932 | Biggs, N. W. |
| 2,229,116 | October 20, 1942 | Svirsky, B. |
| 2,476,817 | July 19, 1949 | Charnes, J. E. |
| 2,559,064 | July 3, 1951 | Cunningham, M. M. |
| 2,612,924 | October 7, 1952 | Cunningham, M. M. |
| 2,613,169 | October 7, 1952 | Cunningham, M. M. |
| 2,623,571 | December 30, 1952 | Webber, E. G. |
| 2,672,902 | March 23, 1954 | Prager, W. |
| 2,927,609 | March 8, 1960 | Vanderlans, C. J. F. |
| 3,103,235 | September 10, 1963 | Stringham III, E. B. |
| 3,168,909 | February 9, 1965 | Zurbrigen, J. A. et al. |
| 3,269,421 | August 30, 1966 | Telford, E. B. et al. |
| 3,618,639 | November 9, 1971 | Daley, D. R. et al. |
| 3,750,711 | August 7, 1973 | Conklin, et al. |
| 3,763,896 | October 9, 1973 | Horne, et al. |
| 3,834,422 | September 10, 1974 | Larson |
| 3,874,926 | April 1, 1975 | Horne, et al. |
| 3,897,088 | July 29, 1975 | Beinhaur |
| 3,951,173 | April 20, 1976 | Larson |
| 4,025,360 | May 24, 1977 | Horne, et al |
| 4,070,904 | January 31, 1978 | Vanderlans |
| 4,079,755 | March 21, 1978 | Vanderlans |
| 4,096,997 | June 27, 1978 | Larson |

-continued

| PATENT NO. | ISSUE DATE | INVENTOR |
|---|---|---|
| 4,182,642 | January 8, 1980 | Vanderlans |
| 4,274,206 | June 23, 1981 | Moolenaar |
| 4,377,184 | March 22, 1983 | Vetter |
| 4,421,698 | December 20, 1983 | Vanderlans |
| 4,446,983 | May 8, 1984 | Cerber |
| 4,467,835 | August 28, 1984 | Champleboux |
| 4,467,836 | August 28, 1984 | Ragout |
| 4,493,344 | January 15, 1985 | Mathison, et al. |
| 4,612,961 | September 23, 1986 | Vetter |
| 4,614,206 | September 30, 1986 | Mathison, et al. |
| 4,627,470 | December 9, 1986 | Carruthers |
| 4,691,728 | September 8, 1987 | Mathison, et al. |
| 4,721,397 | January 26, 1988 | Knutar |
| 4,763,511 | August 16, 1988 | Mathison, et al. |
| Des. 300,350 | March 21, 1989 | Mathison |
| 4,817,671 | April 4, 1989 | Mathison, et al. |
| 4,883,094 | November 28, 1989 | Vetter |
| 6,019,136 | February 1, 2000 | Walsh, et al. |

Mechanics of Pneumatic Tires; U.S. National Bureau of Standards; Joseph D. Walter; Issued: November 1971; pp 405–421.

So. Ca. P; General Catalogue; Date of Issue and author unknown.

Uniroyal Brochure "Uniroyal Pipe Stoppers"; Uniroyal, Inc., Engineered Systems Depts.; Date of Issue unknown.

SUMMARY OF THE INVENTION

The present invention is distinguishable over the known prior art in a multiplicity of ways. In its most elemental form, the invention takes into account the difficulties of installing an internal sleeve at a joint that constitutes the juncture of the main line and feeder line. To accommodate for the geometry of such a joint within a pipeline there is provided a lateral packer and a felt.

The lateral packer has a hollow shaft ending in a solid cap with a steel pull eye embedded in the cap and an inflation fitting running through the cap into the hollow shaft. At the opposite end of the cap is a flange that abuts the hollow shaft thus creating a chamber. The flange is formed from at least two plys of suitable material. The ply closest to the hollow shaft is fixed thereto and has a bore proximate the center of the flange. The second ply is fixed to the first ply and has two bores, one of which is in-line with the bore on the first ply. Prior to assembly of the first ply to the hollow shaft and the second ply to the first ply of the flange, another inflation fitting is set into the two bores that are in-line and another steel pull eye is sandwiched between the two plies with its distal end protruding through the second bore within the second ply. The felt is generally shaped like a "top-hat," less the top that closes a crown.

The felt is placed over the shaft with its brim resting on the flange. The felt is either impregnated, saturated or doped with epoxy. It is this epoxy that causes the felt to fix to the internal surface of the joint that has the crack, thus sealing the crack from the inside of the pipeline. The felt can also have woven into it an olefin string. During the packaging together of the lateral packer and the felt, the olefin string is attached on one side of the felt, extended over the shaft and through the steel pull eye on the cap and returned to the felt and attached thereto. This causes the felt to remain substantially fixed in position on the lateral packer and avoids the scrunching down of the felt toward the flange while the combination is being moved into position within the pipeline.

In operation, the combination described supra has attached to it a hose with matching inflation fitting attached to either inflation fitting and cable attached to either or both steel pull eyes. The cable is fed through the area of pipeline that contains the section that needs repair. Once the cable is fed through, the combination is navigated into a position over the location of the crack. Then an inflation fluid or material is pumped through the hose and into the hollow shaft via the inflation fitting. Filling the hollow shaft with an inflation medium causes it to expand radially. This radial expansion presses the felt against the inside of the pipeline. This pressurization of the felt activates the epoxy coating on the felt which causes the epoxy to harden and fixes the felt to the inside of the pipeline while also filling the crack with epoxy and felt material thus making a seal to inhibit infiltration. The lateral packer is then deflated which leaves the felt attached to the inside of the pipeline. Then the lateral packer is removed by the cabling attached to either or both steel pull eyes.

This operation described hereinabove takes less time than the operation of the prior art. Further, by utilizing the present invention, multiple operations as described above can occur concurrently within the same section of the pipeline. This has the advantage of reducing the overall time a section of pipeline is inoperable because of the ongoing repair process.

The lateral packer is distinguished over the known prior art in a multiplicity of ways. In its most elemental form, the invention takes into account the forces that are generated during the inflation process of the plug and harness those forces to increase the structural integrity of the plug as the inflation process proceeds to its optimum design level. While the term "inflation" is used throughout the text, it should be understood that any sort of pressure which causes distension of the plug is intended as within the ambit of the instant invention.

In its elementary form, the lateral packer is made from a solid material. Preferably the solid material is an elastomer, particularly natural or synthetic rubber.

OBJECTS OF THE INVENTION

Accordingly, it is a primary object of the present invention to provide a novel and useful lateral packer by itself and in combination with a felt.

A further object of the present invention is to provide a device as characterized above which is extremely durable in construction, safe to use and lends itself to mass production techniques.

Another further object of the present invention is to provide a system for efficiently inhibiting infiltration into a pipeline.

Viewed from a first vantage point, it is an object of the present invention to provide a system for efficiently inhibiting infiltration into a pipeline comprising; means for inhibiting infiltration of at least one of fluid and particulate matter; and means for positioning said means for inhibiting in the pipeline.

Viewed from a second vantage point, it is an object of the present invention to provide a combination for efficiently inhibiting infiltration into pipeline, the combination comprising: a lateral packer and a felt.

Viewed from a third vantage point, it is an object of the present invention to provide a lateral packer for efficiently inhibiting infiltration into a pipeline, comprising: a shaft; an end cap on the distal end of said shaft; and a flange on said proximal end of said shaft.

Viewed from a fourth vantage point, it is an object of the present invention to provide a method for efficiently inhibiting infiltration into a pipeline with a lateral packer and felt combination the steps comprising: inserting the combination into the pipeline; guiding the combination through the pipeline toward an area that is a source of infiltration; positioning the combination proximate the source; inflating the lateral packer such that the felt contacts the source and adheres to the source after a period of time; deflating the lateral packer whereby leaving the felt in place; and removing the lateral packer.

Viewed from a fifth vantage point, it is an object of the present invention to provide a method for efficiently inhibiting infiltration at a juncture in a pipeline, the steps comprising: inserting a lateral packer and felt combination into the pipeline; guiding the combination through the pipeline toward an area that is a source of infiltration; wedging the combination into the juncture such that a brim on the felt contacts an inner surface of the pipeline proximate the juncture; inflating the lateral packer such that the remaining felt contacts the inner surface of the pipeline proximate the juncture, whereby subsequent the inflation the felt adheres to the inner surface of the pipeline at the juncture; deflating the lateral packer, whereby leaving the felt in place; and removing the lateral packer.

Viewed from a sixth vantage point, it is an object of the present invention to provide a process for making a product that efficiently inhibits infiltration at a juncture in a pipeline, the steps comprising: forming a hollow shaft; attaching an end cap having a first inflation fitting and a first anchoring means fixed thereto; attaching a flange at an end opposite from said end cap, said flange having a second inflation fitting and a second anchoring means fixed thereto; placing a felt having a crown and a brim over said hollow shaft whereby said brim contacts said flange; and attaching a string to a first point on said felt, passing said string through said first anchoring means and attaching said string to a second point of said felt.

These and other objects will be made manifest when considering the following detailed specification when taken in conjunction with the appended drawing figures.

BRIEF DESCRIPTION OF THE DRAWINGS

FIG. 1 is a perspective view of a preferred embodiment incorporating features of the present invention.

FIG. 2 is an illustration providing an overview of the operation according to the present invention.

FIG. 3 is an illustration of a preferred embodiment incorporating features of the present invention within a pipeline.

FIG. 4 is a cut-away view of a preferred embodiment incorporating features of the present invention.

FIG. 5 is a cut-away view of an alternative embodiment incorporating features of the present invention.

DESCRIPTION OF PREFERRED EMBODIMENTS

Figure 6:
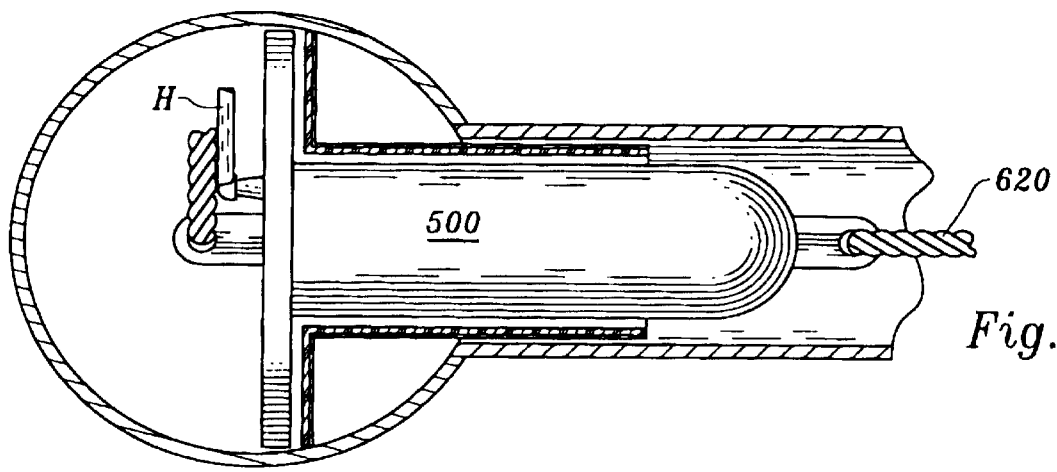
FIGS. 6, 7, and 8 show a sequential order of placement of a preferred embodiment according to an operation following the features of the present invention.
Figure 7:
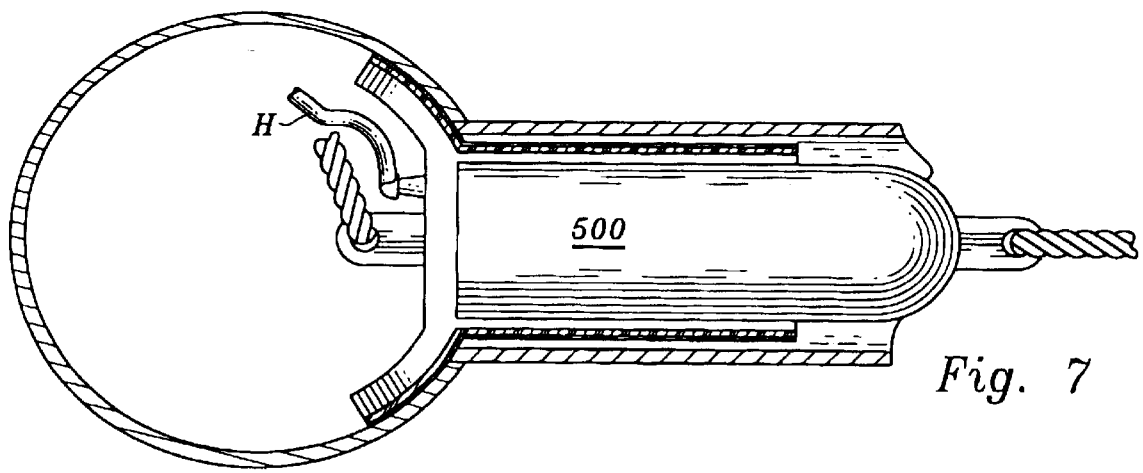
Figure 8:
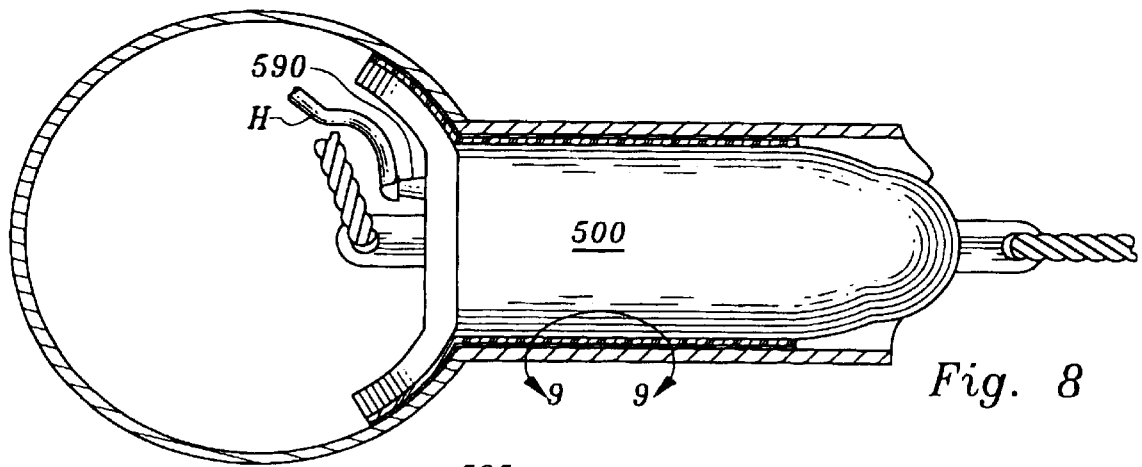

Referring to the drawings now, wherein like reference numerals refer to like parts throughout the various drawing figures, reference numeral 500 is directed to the preferred embodiment of the lateral packer and felt combination (FIGS. 1 through 11).

In its essence, the preferred embodiments within FIGS. 1 through 11 reflect the features and methodology of the present invention.

Figure 9:
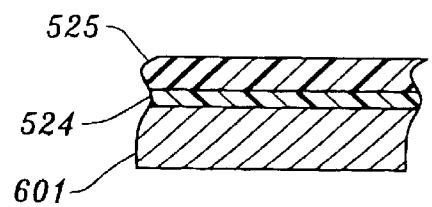
FIG. 9 is a sectional view showing the different layers and the interaction of the layers following the features of the present invention.
Figure 11:
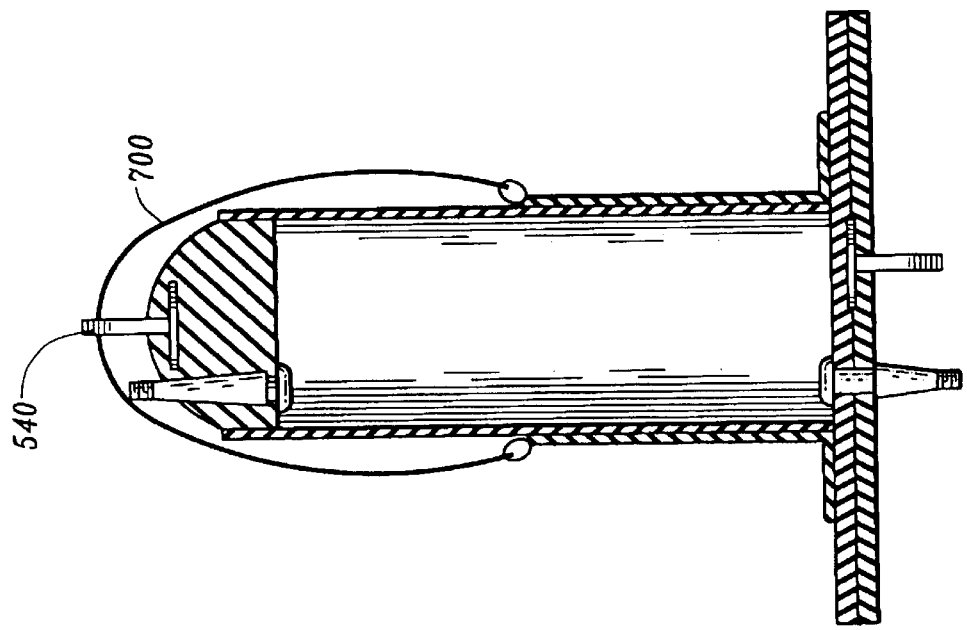
FIG. 11 is a partial cut-away side view of another preferred embodiment of the present invention utilizing a means to maintain the parts constituting this preferred embodiment in a particular relationship relative to each other.
Figure 10:
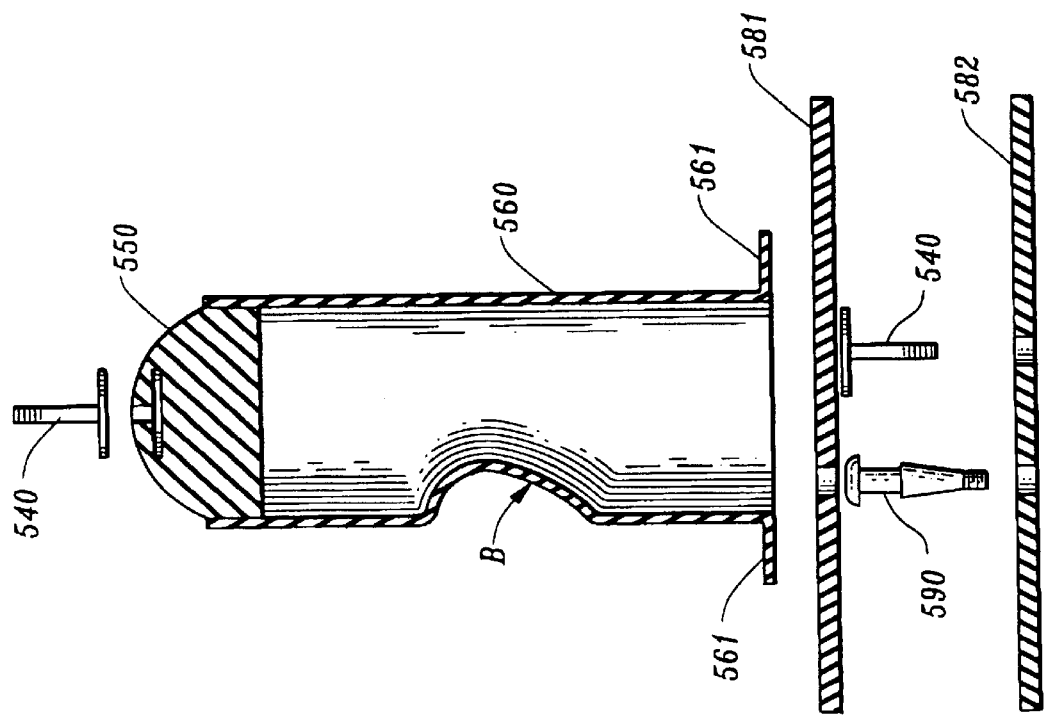
FIG. 10 is an exploded view showing how parts that constitute a preferred embodiment are interrelated in order to follow the features of the present invention.

As seen in FIGS. 1, 4, 9, 10 and 11, a preferred embodiment 500 constitutes two main assemblies combined into a device to facilitate the inhibition of infiltration into or out of a pipeline. The first assembly is a lateral packer 530. The lateral packer 530 is comprised of a hollow shaft 560, see FIGS. 4 and 10. At one end of the shaft 560 is an end cap 550. Proximate the pole of the end cap 550 is a steel pull eye 540 embedded into the cap. The pull eye 540 permits cabling to be run therethrough. Also, to be further described hereinbelow and shown in FIG. 11 this pull eye 540 permits a string 700 to pass through as well. Also within the end cap 550 is an inflation fitting 590, see FIGS. 4 and 11, which permits communication between the interior and exterior of the hollow shaft 560. At the opposite end of the shaft 560 lies a radially extending flange 580. As seen in FIGS. 4, 10 and 11 (particularly FIG. 10) the flange is constructed preferably from two plys 581, 582. Ply 581 has two bores therethrough; while ply 582 has as single bore in-line with one of the bores in ply 581. An inflation fitting 590 intersects the two plys through the in-line bores of each ply in order to provide communication between the interior and exterior of the hollow shaft 560. Also protruding from a flange face is a second steel pull eye 540 that is sandwiched between the two plys 581, 582 with its distal end protruding through the second bore in play 582.

Viewing FIG. 1, there is shown a "top-hat" felt 520 that slips over the lateral packer 530. The felt 520 has a cylindrical crown 521 and a radially extending brim 523. As seen in FIG. 9, the felt material 525 is one of coated, impregnated, saturated or doped with epoxy 524. It is this epoxy 524 that contacts the inner surface 601 of pipeline 600 and forms a barrier when cured in order to inhibit infiltration into or out of the pipeline 600.

As seen in FIG. 11, the steel pull eye 540 has as an ancillary function: the prevention of felt 520 scrunching down toward the flange 580 when the lateral packer 530 is moved into position in the pipeline 600. A olefin string 700 is attached to one point of on the felt, routed through the pull eye 540 on the cap 550 and attached to a second point on the felt 520. The string is made from olefin in order for it to dissolve upon activation of the epoxy 524. As the crown 521 tries to move toward the brim 523, tension is applied to the string 700. This tension counteracts the forces causing the crown to retract toward the flange as the lateral packer 530 and felt 520 is advanced toward its position in the pipeline 600.

FIG. 2 shows an exemplary overview of the operation of the present invention. The cable 620 is secure to the pull eyes 540 (and alternative embodiment shown in FIG. 5 could be used with equal success) and is fed into the pipeline through an opening (typically a "manhole") in the main line 600 and is retrieved through an opening (typically a "cleanout") that has permitted the cable 620 to transverse the area that contains the source of infiltration. As shown in FIG. 2, there is a hose H with a matching inflation fitting to fitting 590. This hose H is attached to either or both fitting 590. The combination 500 is inserted into the pipeline. Using the cable, the combination 500 is moved into a position proximate the source of infiltration. Once in that position, if the source of infiltration is located a juncture between the main line 600 and a feeder line 610, then combination 500 is positioned such that the shaft traverses the juncture as illustrated in FIG. 3. With the shaft in such a position, the next phase begins and is illustrated by the sequential FIGS. 6, 7 and 8. As seen in FIG. 13, the shaft 560 sits partially in feeder line 610 and main line 600. Using the cable 620 the combination 500 is set into position such that the flange 580 and brim 523 are pressed against the inside of the main line 600, see FIG. 7. At this point, the hollow shaft is inflated through an inflation fitting 590 such that the hollow shaft 560 expands radially thusly firmly pressing the crown 523 against the inner surface of the feeder line 610, see FIG. 8. This pressurization activates the epoxy 524. The epoxy 524 then cures to where it adheres itself and the felt 520 to the inside surfaces of the main line 600 and feed line 601, see FIG. 16. The curing process makes a seal thus forming a barrier to the source or potential source of infiltration in the pipeline. Next the hollow shaft is deflated and the process of removal of the lateral packer 530 follows the reverse order of how the combination 500 was placed inside the pipeline.

Typically the shaft 560 is formed as a rubber or elastomeric sleeve which distends when inflated. End cap 550 is a solid rubber or elastomeric curved element having a solid cylindrical portion bonded to an interior of the elastomeric or rubber sleeve of shaft 560. B in FIG. 10 shows a cutaway of the flexible shaft 560. Shaft 561 may include a turn out 561 adjacent ply 581 for bonding thereto.

Each pulley has an embedded disc shaped base and an upstanding pull eyelet projecting from ends of the packer. Each inflation fitting as a bulbous base bonded to the packer and a free end nozzle valve projecting from the packer coupleable to the hose H.

Moreover, having thus described the invention, it should be apparent that numerous structural modifications and adaptations may be resorted to without departing from the scope and fair meaning of the instant invention as set forth hereinabove and as described hereinbelow by the claims.

FIG. 2 shows an exemplary overview of the operation of the present invention. The cable 620 is secure to the pull eyes 540 (and alternative embodiment shown in FIG. 5 could be used with equal success) and is fed into the pipeline through an opening (typically a "manhole") in the main line 600 and is retrieved through an opening (typically a "cleanout") that has permitted the cable 620 to traverse the area that contains the source of infiltration. As shown in FIG. 2, there is a hose H with a matching inflation fitting to fitting 590. This hose H is attached to either or both fitting 590. The combination 500 is inserted into the pipeline. Using the cable, the combination 500 is moved into a position proximate the source of infiltration. Once in that position, if the source of infiltration is located a juncture between the main line 600 and a feeder line 610, then combination 500 is positioned such that the shaft traverses the juncture as illustrated in FIG. 3. With the shaft in such a position, the next phase begins and is illustrated by the sequential FIGS. 6, 7 and 8. As seen in FIG. 3, the shaft 560 sits partially in feeder line 610 and main line 600. Using the cable 620 the combination 500 is set into position such that the flange 580 and brim 523 are pressed against the inside of the main line 600, see FIG. 7. At this point, the hollow shaft is inflated through an inflation fitting 590 such that the hollow shaft 560 expands radially thusly firmly pressing the crown 523 against the inner surface of the feeder line 610, see FIG. 8. This pressurization activates the epoxy 524. The epoxy 524 then cures to where it adheres itself and the felt 520 to the inside surfaces of the main line 600 and feed line 601, see FIG. 9. The curing process makes a seal thus forming a barrier to the source or potential source of infiltration in the pipeline. Next the hollow shaft is deflated and the process of removal of the lateral packer 530 follows the reverse order of how the combination 500 was placed inside the pipeline.

Typically the shaft 560 is formed as a rubber or elastomeric sleeve which distends when inflated. End cap 550 is a solid rubber or elastomeric curved element having a solid cylindrical portion bonded to an interior of the elastomeric or rubber sleeve of shaft 560. B in FIG. 10 shows a cutaway of the flexible shaft 560. Shaft 561 may include a turn out 561 adjacent ply 581 for bonding thereto.

Each pull eye has an embedded disc shaped base and an upstanding pull eyelet projecting from ends of the packer. Each inflation fitting as a bulbous base bonded to

We claim:

1. A process for making a product that efficiently inhibits infiltration at a juncture in a pipeline where a branch pipe leads from a main pipe, the steps comprising:

forming a hollow shaft;

attaching an end cap having a first inflation fitting and a first anchoring means fixed thereto;

attaching a flange at an end opposite from said end cap, said flange having a second inflation fitting and a second anchoring means fixed thereto;

placing a felt having a crown and a brim over said hollow shaft whereby said brim contacts said flange;

attaching a string to a first point on said felt, passing said string through said first anchoring means and attaching said string to a second point of said felt, and installing the felt on an interior of the pipeline at the juncture of the main and branch pipes by locating the felt brim in the main pipe at a periphery of the branch and projecting the crown into the branch and, after inflating the hollow shaft to secure the felt in location, subsequently deflating the shaft and using cable to retrieve the lateral packer, whereby, while the packer is deployed in the branch, the main pipe is still open for use as a conduit.

* * * * *